United States Patent [19]

Collodel

[11] Patent Number: 4,696,503
[45] Date of Patent: Sep. 29, 1987

[54] PNEUMATIC ACTUATED CAM DRIVEN PARALLEL GRIPPER

[75] Inventor: Zurino P. Collodel, Vernon, N.J.

[73] Assignee: The Singer Company, Stamford, Conn.

[21] Appl. No.: 923,225

[22] Filed: Oct. 27, 1986

[51] Int. Cl.⁴ .............................................. B25J 15/08
[52] U.S. Cl. ................................... 294/88; 294/119.1; 901/37; 901/39
[58] Field of Search ...................... 294/67.33, 86.4, 88, 294/93, 94, 103.1, 116, 119.1, 902; 269/32, 34; 414/741; 901/31, 36-39

[56] References Cited

U.S. PATENT DOCUMENTS

| 2,341,602 | 2/1944 | Dewey | 269/34 X |
| 4,279,438 | 7/1981 | Singh | 294/93 X |
| 4,479,673 | 10/1984 | Inaba et al. | 294/119.1 X |
| 4,579,380 | 4/1986 | Zaremsky et al. | 294/119.1 |
| 4,629,237 | 12/1986 | Ito | 294/119.1 |

FOREIGN PATENT DOCUMENTS

| 3325921 | 1/1985 | Fed. Rep. of Germany | 294/119.1 |
| 18165 | 2/1978 | Japan | 294/119.1 |
| 715426 | 2/1980 | U.S.S.R. | 294/119.1 |
| 804421 | 2/1981 | U.S.S.R. | 901/36 |

Primary Examiner—Johnny D. Cherry
Attorney, Agent, or Firm—David L. Davis

[57] ABSTRACT

A pneumatic actuated cam driven parallel gripper includes a supporting bracket adapted for attachment to the end of an arm of a robot or a pick and place system. A cam comprising a cylindrical member is supported for rotation in the bracket and has at its outer periphery diametrically opposed pins, with a lever attached to the cam. A pneumatic actuator is coupled to the lever and adapted to rotate the lever and cam between a first and second position. First and second slides with attachable fingers are supported for sliding movement on shafts extending from the two sides of the brackets. First and second compliant arms have one end attached to one of the pins on the cam cylinder and another end attached to one of the slides for converting rotation of the cylindrical member into linear movement of the slides.

16 Claims, 2 Drawing Figures

PNEUMATIC ACTUATED CAM DRIVEN PARALLEL GRIPPER

BACKGROUND OF THE INVENTION

This invention relates to robotics in general, and more particularly to an improved gripper for a robot or pick and place device which gripper can be changed and customed fitted to a variety of different jobs.

In current grippers, the actuators, which are typically air cylinders, mechanical drives and fingers are integrated into a single unit. As a result, when it is desired to change functions of the robot or gripper, the entire gripper must be changed. Furthermore, in the case of gripper failure, the entire gripper must be removed, and another gripper which is to perform the same task must be put in place to continue line flow. In many cases this requires reprogramming or reteaching points. In addition, currently available grippers are expensive because the actuator and mechanical drive are integral parts of the device and must be changed when the device is changed. Typical examples of prior art grippers are those disclosed in U.S. Pat. Nos. 3,247,978; 3,620,095; 3,630,391; 3,734,556; 3,881,761; 4,368,913; and 4,377,305.

In view of the above problems with currently available grippers, it becomes clear that there is a need for a low cost gripper which can be used as an end-of-arm tool for various robots or pick and place applications and which is capable of a variety of tasks simply by changing small portions of the gripper.

SUMMARY OF THE INVENTION

The present invention provides such a device. Basically, this is accomplished by utilizing a lever driven rotating cam to control the opening and closing of the gripper. Attached to the rotating cam are compliant arms which are spring loaded to account for different fingers on the gripper. Finally, the gripper is designed in such a way that fingers and air cylinders can be changed in situ. From these measures, it is possible to permit a variety of tasks to be performed simply by changing small parts of the gripper, i.e. fingers. The entire gripper may be customed fitted to large objects such as furniture or small light objects such as electronic components. The gripper does not have to be removed to be serviced. The gripper can thus perform a variety of tasks at a relatively low cost because the actuator and mechanical drive need not be changed each time the function of the device is changed.

As a result of this design, the present invention provides simplicity of operation and repair. The gripper need not be removed to be repaired; cylinders and/or slides can be replaced in situ. Furthermore, because of this design all parts that are unique to a particular application are commercially available at relatively low cost. The design permits a wide choice of gripper fingers to be used in the same carriage depending upon application with consideration for: weight carrying capacities; physical size of the object to be picked up; gripper pressures needed; and whether the object is to be picked up in a closed or opened position of the gripper. Furthermore, with the design of the present invention, various air pressures can be used in the same operation.

DETAILED DESCRIPTION

Figure 2:
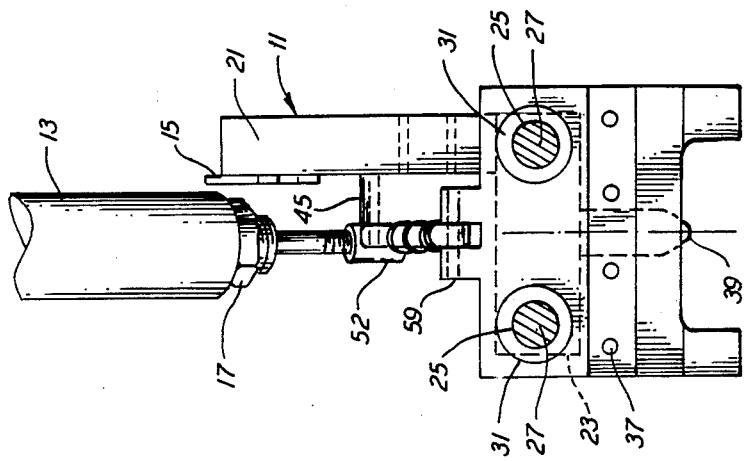
FIG. 2 is a side elevation view of the grippe of FIG. 1.
Figure 1:
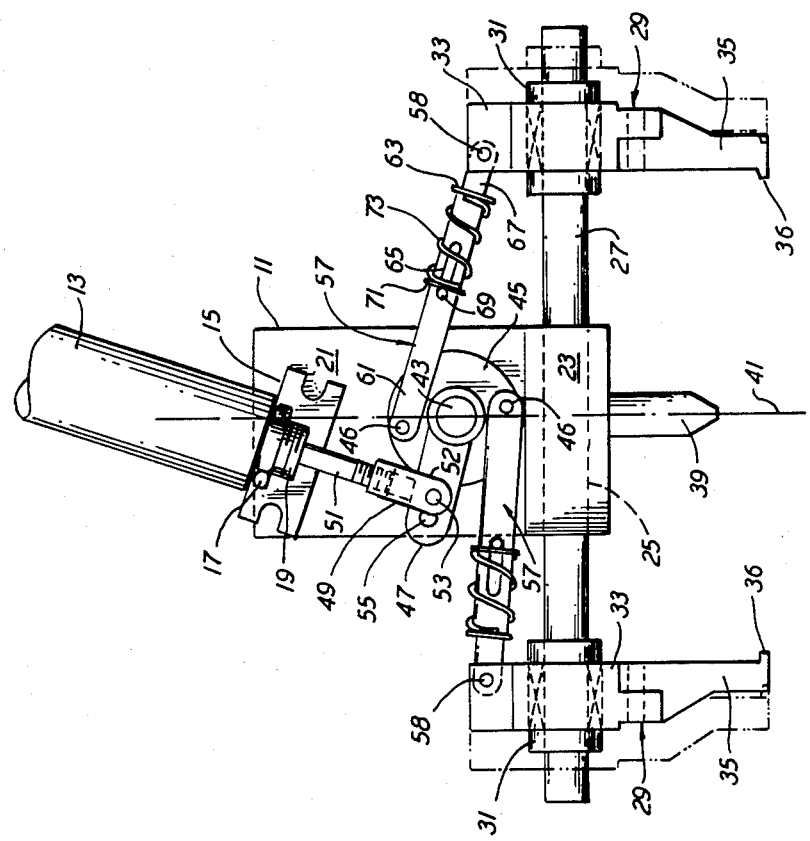
FIG. 1 is a front elevation view of the gripper of the present invention, showing the gripper in the closed position in solid lines and in the opened position in dotted lines.

As illustrated by FIG. 1 the gripper of the present invention includes a main support bracket 11. Bracket 11 attaches to the end of the arm of a robot or pick and place system. The bracket provides support for the rest of the apparatus. This includes an air cylinder 13 of conventional design which contains a mounting bracket 15 by means of which it is fastened to the bracket 11. Bracket 15 is held in place by a nut 17 screwed on to a threaded cylindrical portion 19 extending from the end of the air cylinder 13. Bracket 11, as can be seen from the side view of FIG. 2, has an L-shape and thus includes a vertically extending portion 21 and a horizontally extending portion 23. Contained within the horizontal portion 23 are two bores 25 through which shafts 27 are inserted preferably by press fitting. The shafts 27 extend from each side of the horizontal portion 23. On the ends of the shaft are the slides 29 of the gripper. These are supported on the shafts 27 in slide ball bearings 31. The shafts themselves are preferably made of hardened steel. Alternatively, bearings 31 may be sleeve bearings rather than ball bearings. The slides 29 are made up of two parts, part 33 which is supported in the bearings 31 and part 35 which contains the actual finger end. As indicated, in the illustrated embodiment, the ends of the fingers of portions 35 have a horizontal extending portion 36 which performs the actual gripping function. Parts 35 are held onto parts 33 by means of four bolts 37.

Extending vertically downward from the horizontal portion 23 is a locating pin 39. Locating pin 39 is disposed on a vertical center line or Z axis 41. Center line 41 passes through the center of a shaft 43. Shaft 43 is supported for rotation in the vertical portion 21 of the support bracket 11. Attached to shaft 43 is a cam member 45 of cylindrical shape having two diametrically opposed pins 46 at the periphery thereof. Attached to the cam 45 is a lever 47. Lever 47 in turn is attached to a member 49 threaded on the end of the piston rod 51 of the cylinder 13 which extends out from the cylindrical member 19 in conventional fashion. Member 49 comprises a cylindrical portion with a threaded bore which is threaded over the threaded end of piston rod 51 and two arms 52 extending therefrom. The arms 52 contain holes and a pin 53 extends through the two arms and through a slot 55 in lever 47. Attached to the two pins 46 on the diameter of the cylindrical member 45 are arms 57. Arms 57 are coupled by pins 58 to he parts 33. Each of the parts 33, as best seen from FIG. 2 at the top thereof has a pair of spaced vertical projections 59. Arm 57 is inserted between these projections and has a hole in the end thereof with the pin 58 extending through the holes in the projections 59 and the hole in the arm 57. The two arms 57 are constructed to be compliant so as to permit different types and sizes of fingers 35 for example. To accomplish this, each of the arms 57 is made of two parts. The first part 61 has the hole in one end thereof through which the pin 46 passes and a cylindrical member, e.g., a washer 63 securely attached to the other end thereof. In between the pin 46 and the washer 63 is an elongate opening 65. The second part of arm 57 is the member 67 which contains, at one end, a hole through which the pin 58 passes and at the other end a pin 69. Adjacent to pin 69 which rides in opening 65 is a washer 71. A spring 73 extends between washer 71 and washer 63.

In operation, pneumatic cylinder 13 is air driven in both directions in conventional fashion, for example, controlled by a four way valve or a series of four way valves at different air pressures. As will be recognized by those skilled in the art the valves can be computer controlled with the various air pressures used to vary the gripping force. The piston rod 51 of the air cylinder 13 drives lever 47 which rotates the cam 45. As the cam 45 rotates, it moves the slides 33 by means of the arms 57. When the cam 45 is rotated clockwise, the slides 33 are opened. When it is rotated counter-clockwise, the slides 33 are closed. The springs 73 on arms 57 permit variation of the size of the components. Slide friction is minimized through the use of the linear ball bearings 31.

As the robot approaches the pick-up site, the locating pin 39 located on the Z-axis is above the item to be picked up and the gripper is opened. Over the pick-up site, the locating pin 39 comes down and the fingers 35 of the gripper are then on either side of the piece to be picked up. The pin 39 aligns the piece to the gripper by using a locating hole in the top of the piece to be picked up. The gripper is then closed gripping the piece to be moved. After the piece is moved to its new location, the gripper is then opened by the air cylinder 13.

Although in the illustrated embodiment actuation is by means of an air cylinder, it is also possible to accomplish actuation with a servo motor or motors. Similarly, rather than a single cylinder, dual cylinders can be used. Rather than using arms and a cam system, cable control of the slides 33 is possible so long as the cables are provided with the necessary compliance. These and other modifications can be made without departing from the spirit of the invention which is intended to be limited solely by the appended claims.

What is claimed is:

1. A parallel gripper comprising:
   a supporting bracket for attaching to an end of an arm of a robot or a pick and place system;
   at least one shaft secured to said bracket and extending therefrom in two directions;
   first and second slides mounted on said shaft for sliding motion thereof;
   means to prevent said slides from rotating on said shaft;
   first and second fingers detachably connected to said slides whereby said fingers can be readily replaced or interchanged;
   actuating means; and
   means for coupling said actuating means to said slides such as to move said slides between a first position where said fingers are separated by a first distance and a second position where said fingers are separated by a second distance, said coupling means including first and second arms biasingly coupled to the first and second slides and to said actuating means, said coupling means being compliant so as to permit movement of different fingers between the first and second positions.

2. Apparatus according to claim 1 wherein said actuating means comprises an air cylinder having a piston rod extending therefrom.

3. Apparatus according to claim 2 wherein said means for coupling includes a cam coupled to said air cylinder, and the first and second arms biasingly attach said cam to said first and second slides respectively.

4. Apparatus according to claim 3 wherein said cam comprises:
   a cylindrical member supported for rotation in said supporting bracket;
   attachment means at diametrically opposed peripheral portions of said cylindrical member;
   said first and second arms extending between said attachment means and said first and second slides, respectively; and
   a lever arm attached to said cylindrical member, said lever arm attached to said actuating means.

5. Apparatus according to claim 4 wherein said first and second arms are rotatably attached at said attachment means and at said slides.

6. Apparatus according to claim 5 wherein said arms comprise: a first arm part having means at one end thereof for rotatable attachment to one of said cam and said slide and at the other end thereof to stop means and intermediate said one end and said stop means an elongate slot; and a second arm part having on one end thereof means for attachment to the other of said cam and said slide and at the other end thereof a pin, said pin extending through said elongate slot in said first part; and a spring extending between said pin and said stop means.

7. Apparatus according to claim 6 wherein said means to prevent rotation comprise first and second parallel shafts, said slides mounted for sliding motion on said parallel shafts.

8. Apparatus according to claim 7 wherein bearings are provided mounting said first and second slides to said first and second parallel shafts.

9. Apparatus according to claim 8 wherein said fingers depend downward in a vertical direction and further including a vertically extending locating pin midway between the said fingers extending along a vertical axis.

10. Apparatus according to claim 8 wherein said bearings comprise linear ball bearings.

11. Apparatus according to claim 10 wherein said first and second shafts are made of hardened steel.

12. Apparatus according to claim 11 wherein said first and second supporting brackets are made of a lightweight material.

13. A pneumatic actuated cam driven parallel gripper comprising:
   a support bracket adapted for attachment to the end of an arm of a robot or a pick and place system;
   a cam comprising a cylindrical member supported for rotation in said bracket, said cam having at the outer periphery thereof diametrically opposed first and second pins;
   a lever attached to said cam;
   a pneumatic actuator coupled to said lever and adapted to rotate said lever and said cam between a first and second position;
   first and second horizontally disposed shafts attached to and extending from said bracket in opposite directions;
   first and second slides supported for sliding movement on said shafts on the two sides of said bracket;
   first and second arms each having one end attached to one of said first and second pins on said cylindrical member and another end attached to one of said slides for converting rotation of said cylindrical member into linear movement of said slides, each of said arms comprising a first part having, on the end thereof opposite an end attached to one of said first and second pins on said cylindrical member or to said slide, a stop means and containing an elongate slot intermediate said stop means and said attached end and a second part having one end adapted for attachment to the other of said cylindrical member and slide, containing at the other end thereof a third pin, said third pin extending through said elongate slot in said first part and a spring extending between said stop means and said third pin, biasing said third pin against one end of said slot; and fingers detachably attached to said slides.

14. Apparatus according to claim 13 wherein said slides are supported for motion on said shafts in linear ball bearings.

15. Apparatus according to claim 14 wherein said shafts are made of hardened steel.

16. Apparatus according to claim 15 wherein said supporting bracket is made of a lightweight material.

* * * * *